United States Patent [19]

Sellars

[11] Patent Number: 4,519,007
[45] Date of Patent: May 21, 1985

[54] SERVO-TRACK POSITION DETECTION SYSTEMS

[75] Inventor: Graham P. Sellars, Winsford, England

[73] Assignee: Burroughs Corporation, Detroit, Mich.

[21] Appl. No.: 447,834

[22] Filed: Dec. 8, 1982

[51] Int. Cl.³ .............................................. G11B 5/58
[52] U.S. Cl. ...................................................... 360/77
[58] Field of Search ...................... 360/77; 369/43, 44, 369/56

[56] References Cited

U.S. PATENT DOCUMENTS 4,101,942 7/1978 Jacques .................................. 360/77

OTHER PUBLICATIONS

IBM Technical Disclosure Bulletin, vol. 17, No. 2, Jul. 1974, pp. 456–457, Magnetic Disk Servo Control Device, Zimmermann et al.
IBM Technical Disclosure Bulletin, vol. 18, No. 8, Jan. 1976, pp. 2656–2657, Null Servo Pattern, Betts.

*Primary Examiner*—George G. Stellar
*Attorney, Agent, or Firm*—Kevin R. Peterson; Edmund M. Chung; Mark T. Starr

[57] ABSTRACT

A servo track position detection system overcomes the measurement errors induced by the use of decoders employing two separate signal measuring circuits where the difference between the outputs of the circuits is indicative of the displacement of a signal-recovering transducer from central disposition over the servo track by using a servo track having opposed pairs of polarity transitions which sum the head to give a head output pulse whose polarity and magnitude are indicative of the distance and sense of displacement of the head from central disposition over the servo track and measured in a simple circuit.

20 Claims, 12 Drawing Figures

SERVO-TRACK POSITION DETECTION SYSTEMS

BACKGROUND TO THE INVENTION

1. Field of the Invention

The present invention relates to systems for detecting the positions of benchmarks on a recording medium. It particularly relates to systems where the direction and magnitude of the displacement of a tranducer from being centrally disposed over a servo track recorded on a moving medium is indicated by the output of a decoder in receipt of signals recovered from the servo track by the transducer. Most particularly it relates to such systems where the medium is magnetic tape or disc for the recording of informational data signals.

2. The Prior Art

It is well known in the field of magnetic data recording on moving tape or rotating disc, and latterly in the field of video recording and optical data recording on disc, to employ one or more servo tracks on the tape or disc to act as benchmarks to that signal recovering or recording transducers can be located over the medium in positions measured relatively to the servo track to accurately locate other data signals. It is usual to employ a decoder in receipt of signals recovered from the medium by the transducer, the decoder providing an output signal indicative of the sense and magnitude of displacement of the servo-signal recovering transducer from being centrally disposed over the servo track. The output of the decoder can than be variously used to give indication of the position of the servo track relatively to an external position measuring system to a controller for the controller to use that information to locate the transducer over other, data storage tracks by interpolation or extrapolation, or directly as a position feedback signal in a transducer-positioning servo mechanism to center the transducer over the servo track.

There are many different types of servo tracks sharing the common factor of consisting in two associated sub-tracks. Signal attributes from the sub-tracks are picked up in common by the transducer, separated and compared to indicate the position of the transducer relative to central disposition over the track, central disposition being indicated by equality of the attributes. The so-called dibit system and the so-called tribit system are characteristic of this class. In both cases the decoder measures the amplitudes of position-indicating pulses and subtracts one measurement from the other to provide an output indication by magnitude and sense of the size and direction of the displacement of the tranducer from being centrally disposed over a median line between two contiguous sub-tracks. The pulse amplitude measuring process and the amplitude comparison process are both subject to errors due to the relatively large numbers of components required for their execution by the decoder and the statistical variation in component values.

In both the so-called dibit system and so-called tribit system the linear density of servo signals must be kept low so that successive pulses in the dibit or tribit patterns as recovered by the transducer are far apart from one another compared to the widths of the pulses, so that the pulses do not unduly interfere with one another to disturb their relative values.

It is the trend that an increasing number of data storage tracks are required in closer proximity to one another on the medium, be it disc or tape, magnetic or optical, and in such high track density situations, the output errors produced by a conventional decoder as a result of its multiplicity of components and operations can render the subsequent positioning of a tranducer insufficiently accurate for the proper recording and/or recovery of signals.

It is also the trend that servo information is coming to be recorded interspersed linearly among data signals on common tracks, the decoder being made operational only when servo signals are being recovered by the transducer, thus allowing the transducer to be precisely positioned over the common tracks. In such situations it is deleterious to the data storage capacity of the common tracks to employ a servo system wherein position-indicating pulses must be well separated from one another, as this eats into the part of the common tracks potentially usable for informational data.

Conventional servo signal decoders, because of the high component count and varied operations are required to employ high precision individual components and/or components adjustable during manufacture in order to reduce the many possible sources of error. This causes the conventional servo signal decoder to be high in cost.

It is therefore desirable to provide a servo track position detection system for detecting the position of a transducer relatively to central disposition over a servo track from which it is recovering signals wherein the individual pulses of the servo signal can be recorded in close proximity to one another and wherein the decoder is of simple construction with a low component count and relatively few operations.

SUMMARY OF THE INVENTION

According to a first aspect, the present invention consists in a system for indicating the position of a transducer relatively to a servo track on a moving medium, said servo track comprising first and second sub-tracks, said first sub-track comprising a first component operable to induce a first response in said transducer and a second component operable to induce a second response in said transducer, and said second sub-track comprising a third component operable to induce a third response in said transducer and a fourth component operable to induce a fourth response in said transducer, said first and second sub-tracks being simultaneously accessible by said transducer, said second and fourth components being simultaneously detectable by said transducer, and said second and fourth responses having a polarity opposite to one another and respective magnitudes dependent upon the respective extents of transducer interaction with said first and second sub-tracks, said system comprising a decoder coupled to receive signals recovered from said medium by said transducer and operable to detect and respond to the receipt of said first and third responses to take a sample of the residual response resulting from the cancellation in whole or in part of said second and fourth responses.

According to a second aspect, the present invention consists in a system according to the first aspect characterized by said first and third components being simultaneously detectable by said transducer and by said decoder being operable to take said sample by multiplying said residual response resulting from the cancellation in whole or in part of said second and fourth responses by the rectified and delayed residual response resulting from the cancellation in whole or in part of said first and third responses.

BRIEF DESCRIPTION OF THE PREFERRED EMBODIMENTS

In a preferred embodiment a servo track is recorded on a moving medium. The medium is preferably magnetic. The magnetic medium is preferably a disc for digital, informational data recording. The servo track preferably comprises a first sub-track and a second sub-track. The first and second sub-tracks are preferably recorded contiguously along a median line. The sub-tracks are preferably equal in width or wider than a transducer for recovering signals from the medium. The first and second sub-tracks each preferably comprise areas of a first polarity of magnetization and areas of a second polarity of magnetization. The boundaries between the areas of first and second polarities of magnetization are preferably rectilinear and at right angles to the median line in each sub-track. The first sub-track preferably comprises a first boundary being a transition from the first polarity of polarization of magnetization to the second, and thereafter a second boundary being a transition of magnetic polarization from the second to the first polarity. The second sub-track preferably comprises a third boundary being a transition from magnetization of the second polarity to magnetization of the first polarity, and a fourth boundary being a transition from the magnetic polarization of the first polarity to polarization of the second polarity. The second boundary in the first sub-track is preferably aligned with the fourth boundary of the second sub-track.

In a first preferred embodiment of the servo track the first boundary of the first sub-track is preferably aligned with the third boundary of the second sub-track. The transducer preferably responds to the difference in the change of magnetic flux encountered as the alignment of the third and first boundaries passes therebeneath to provide a first residual pulse whose amplitude is proportional to the relative difference between the amounts of said first and second sub-tracks interacting with the transducer. The transducer preferably responds to the change in magnetic flux encountered as the alignment of the fourth and second boundaries passes therebeneath to provide a second residual pulse whose amplitude and sense is proportional to the relative difference between the amounts of said first and second sub-tracks interacting with the transducer.

In a first preferred decoder, for use with the first preferred embodiment of the servo track, a composite peak detector is operable to detect the first residual pulse and in response thereto to operate a timer. The timer preferably opens an analog gate during the period of receipt of the second residual pulse. The output of the analog gate is preferably provided as the input to a smoothing circuit. The smoothing circuit is preferably a low pass filter. The input to the analog gate is preferably the signal recovered by the transducer from the servo track. The output of the low pass filter is preferably provided as the output of the decoder. The timer is preferably non-retriggerable during its timing operation and has a period less than the time between successive first residual pulses. The composite peak detector preferably comprises a positive peak detector, a negative peak detector, and an "OR" gate for combining the logical pulse outputs of the two.

In a second preferred embodiment of the decoder for use with the first embodiment of the servo track the signal recovered from the servo track by the transducer is coupled as the rectified input to a multiplier. The signal from the transducer is preferably supplied as the input to a delay circuit. The delay circuit preferably delays the transducer output signal by a time equal to the interval between a first residual pulse and a second residual pulse. The output of the delay circuit is preferably provided as the second input to the multiplier. The output of the multiplier is preferably the analog multiple of its two inputs and is coupled via a low pass filter as the output of the decoder.

In a second preferred embodiment of the servo track all is as in the first preferred embodiment of the servo track save that the first and third boundaries in the first and second sub-tracks respectively are not aligned so that the first residual pulse is lost and becomes first and second timing pulses whose amplitudes are substantially independent of the position of the transducer relative to the median line.

In both the first and second preferred embodiments of the servo track the distance from the first to the second boundaries is less than the distance between the second boundary and any subsequent first boundary and the distance between the third boundary and the fourth boundary is less than the distance between the fourth boundary and any subsequent third boundary.

In a third preferred embodiment of the decoder, for use with the second preferred embodiment of the servo track, all is as in the first preferred embodiment of the decoder save that the composite peak detector is replaced with a dual peak detector for detecting the first and/or second timing pulses.

BRIEF DESCRIPTION OF THE DRAWINGS

The invention is further explained, by way of example, by the following decription in conjunction with the appended drawings, in which.

DETAILED DESCRIPTION OF THE PREFERRED EMBODIMENT

Figure 1:
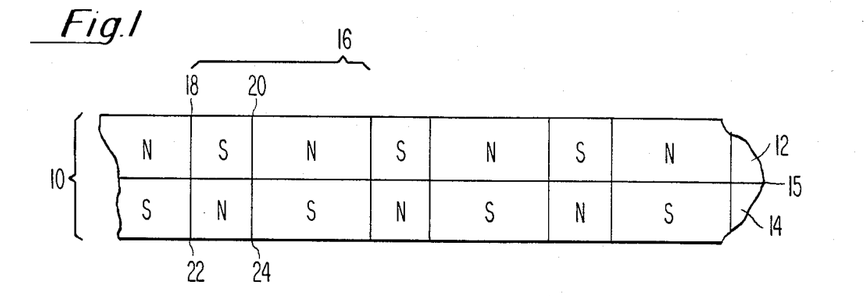
FIG. 1 shows a servo track of the first preferred kind.

FIG. 1 shows the servo track in its first preferred embodiment.

The servo track 10 comprises a first sub-track 12 and a second sub-track 14 contiguously recorded along a median line 15. Both sub-tracks 12, 14 comprise areas of a first polarity of magnetization N alternating with areas of a second polarity of magnetization S, the servo track 10 being recorded on a magnetic informational data storage rotary disc. The boundaries between the first areas N and the second areas S are everywhere at right angles to median line 15.

The areas N, S alternate along the length of the servo track 10 to form a repetitious plurality of servo patterns 16. In the first sub-track the pattern 16 comprises a first boundary 18 between a first area N and a second area S and a second boundary 20 between a second area S and a first area N. In the second sub-track the pattern 16 comprises a third boundary 22 between a second area S and a first area N and a fourth boundary 24 between a first area N and a second area S. The first boundary 18 is co-incident with the third boundary 22 along the length of the track 10 with a magnetization change of opposite sense and the second boundary 20 is similarly co-incident and similarly opposite in sense with the fourth boundary. The distance between the first boundary 18 and the second boundary 20 is less than the distance between the second boundary 20 and the subsequent first boundary 18 in a pattern. Because of the coincidence of the first and third boundaries 18, 22 and of the second and fourth boundaries 20, 24 the same relationship holds in linear spacing for the third to the fourth boundaries 22, 24 as holds for the first to the second boundaries 18, 20 respectively.

It is to be appreciated that whereas the servo track 10 is here depicted as comprising a repetitive plurality of patterns the description equally applies where the servo track 10 comprises just a single pattern 16 as might be encountered when servo information is laid down among other signals on a common track.

Figure 2A:
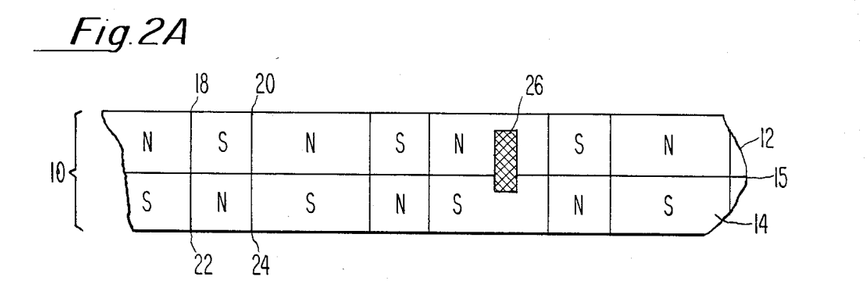
FIGS. 2A, 2B and 2C show a transducer in different positions on the servo track of FIG. 1.

FIG. 2A shows a magnetic head 26 disposed over the servo track 10 such that it is more interactive with the first sub-track 12 than with the second 14. The boundaries 18, 20, 22, 24 each cause an output pulse in the head 26 whose amplitude is proportional to the relative extent of the width of the head 26 over which the boundary 18, 20, 22, 24 extends and whose polarity is dependent upon the sense of the change of polarization of magnetization N, S of the boundary 18, 20, 22, 24. Thus, the first and second boundaries 18, 20 will produce greater output than the third and fourth boundaries 22, 24.

Figure 2B:
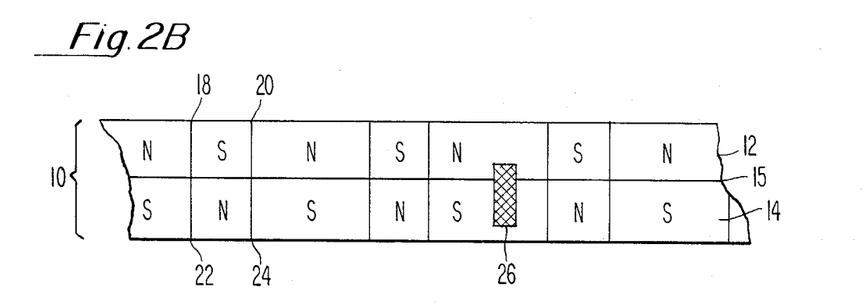

FIG. 2B shows the head 26 disposed more over the second sub-track 14 than over the first sub-track 12. In this instance the third and fourth boundaries 22, 24 produce greater output from the head 26 than do the first and second boundaries 18, 20.

Figure 2C:
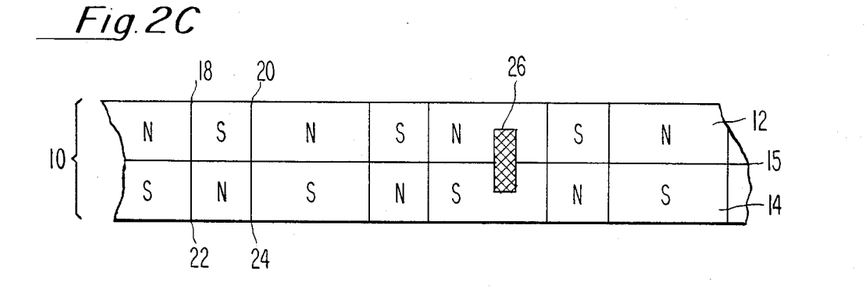

FIG. 2C shows the head 26 equally disposed over both sub-tracks 12, 14 so that the first and second boundaries 18, 20 produce the same output amplitudes as do the third and fourth boundaries 22, 24.

It is to be appreciated that the head 26 is representative of the area of interaction of any kind of transducer on any recording medium. In the case of the preferred embodiment the head is magnetic and the representation 26 thereof indicates the flux-intercepting gap of such a head. In other circumstances the representation 26 can be taken as indicating a laser reader for optical discs and the like.

Figure 3A:
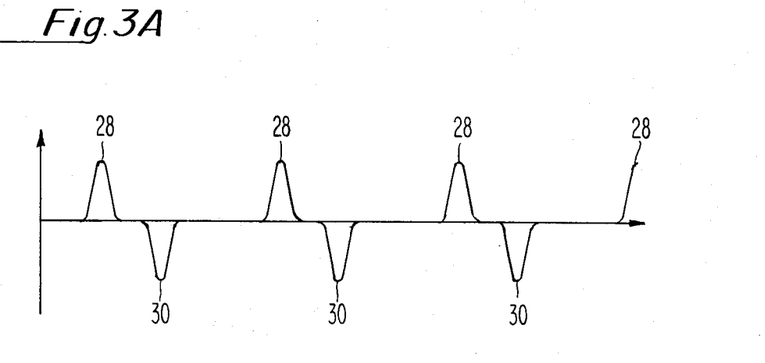
FIGS. 3A, 3B and 3C show the signals recovered by the transducer from the servo track when in each of the positions indicated in FIGS. 2A 2B and 2C respectively.

FIG. 3A shows the output waveform recovered from the track 10 by the head 26 when in the position indicated in FIG. 2A.

It is assumed in the following description that the head 26 is static and the track 10 moves towards the left of FIGS. 2A to 2C with uniform velocity. This can be achieved when the track 10 is on moving tape by movement of the tape in the conventional manner. When the track 10 is recorded on a disc the movement of the track 10 is achieved by rotation of the disc, in which circumstance the track 10 as depicted in FIGS. 2A to 2C is in fact a portion of a circular track 10 extending right round the disc at a predetermined radius relative to the center of rotation.

It is also assumed in the following description that whenever a boundary which is a change from magnetic polarization of the first kind N to magnetic polarization of the second kind S passes beneath the head 26 it induces in the head a pulse with positive polarity and whenever a boundary which is a change from magnetic polarization of the second kind S to magnetic polarization of the first kind N passes beneath the head 26 it induces in the head a pulse with negative polarity.

It will be apparent from the following descriptions how the embodiments of the invention can be altered to accommodate non-uniform track 10 velocity. It will also be apparent how the invention can be modified in its embodiments to allow for responses of opposite polarity from the head 26. It will further be appreciated that where the representation of the head 26 is taken as being indicative of some other kind of transducer other than a flux-change sensitive head, the output thereof can readily be converted to the pulse form as described by the application of well-known techniques.

The first and third boundaries 18 22 pass beneath the head 26 simultaneously. The first boundary 18 being from the first sense of magnetization N to the second S induces a positive pulse response in the head 26 and the third boundary being from the second sense of magnetization S to the first N induces a negative pulse response in the head 26. The head 26 is more over the first boundary 18 than over the third boundary 22, the amplitude of the response from the first boundary 18 therefore being greater than the amplitude of the response from the third boundary 22. The responses from the first and third boundaries 18, 22 partially cancel to leave a first residual pulse 28 which is predominantly positive.

In just the same way the second and fourth boundaries 20, 24 pass beneath the head 26 simultaneously the second boundary 20 inducing a negative pulse response in the head 26 and the fourth boundary 24 inducing a positive pulse response in the head 26. The response from the second boundary 20 has a greater size than the response from the fourth boundary 24 because of the position of the head 26. The two responses cancel in part to leave a second residual pulse 30 of the same size but opposite polarity to the first residual pulse 28.

Figure 3B:
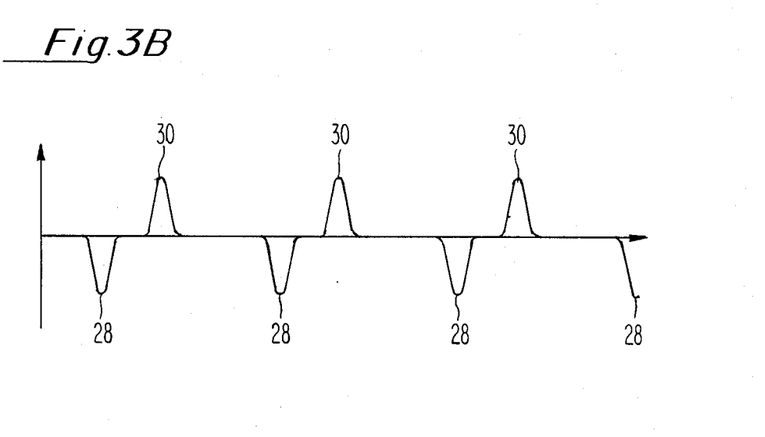

FIG. 3B shows the output waveform of the head 26 when in the position depicted in FIG. 2B.

The head 26 is more over the second sub-track 14 than over the first 12 so that the amplitude of the response induced in the head 26 by the third boundary 22 is greater than the amplitude of the response induced in the head by the first boundary 18 and the amplitude of the response induced in the head 26 by the fourth boundary 24 is greater than the amplitude of the response induced in the head 26 by the second boundary 20. As a result of pulse cancellation, the first residual pulse 28 is therefore negative and the second residual pulse 30 is positive and of the same size.

Figure 3C:
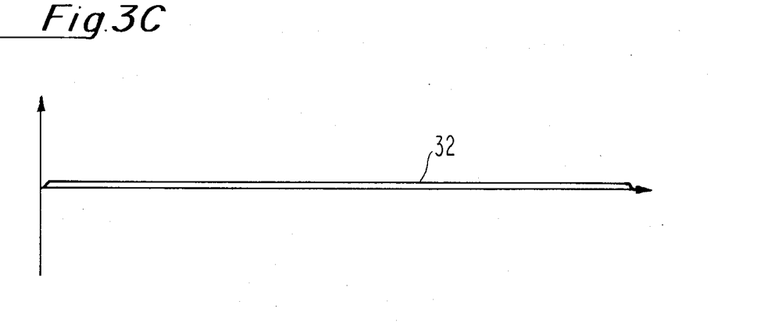

FIG. 3C shows the output waveform of the head 26 when in the position depicted in FIG. 2C.

The head 26 is equally over both sub-tracks 12, 14 and the first boundary 18 induces an equal and opposite response to the negative response induced in the head 26 by the third boundary 22. Similarly the second boundary 20 induces a negative pulse response in the head 26 which is equal and opposite to the positive pulse response induced in the head 26 by the fourth boundary. The responses each being equal and opposite to their respective opposed response, the output of the head 26 reduces to the zero line 32, the amplitude of the first and second residual pulses 28, 30 having been reduced to nothing by cancellation.

It is to be appreciated that the situations as depicted by FIGS. 3A to 3C are representative of continuous variation as the head 26 moves from disposition over one sub-track to disposition over the other 12, 14. The first residual pulse 28 reaches maximum positive value and the second residual pulse 30 reaches maximum negative value when the head 26 is entirely over the first sub-track 12. Similarly, the first residual pulse 28 reaches maximum negative value and the second residual pulse 30 reaches maximum positive valve when the head 26 is entirely over the second sub-track 14. The amplitudes of the first and second residual pulses 28, 30 increase together linearly with the magnitude of displacement of the head 26 from being central over the median line 15 and have a polarity which depends upon the direction from the median line 15 in which the head 26 is displaced.

Figure 4:
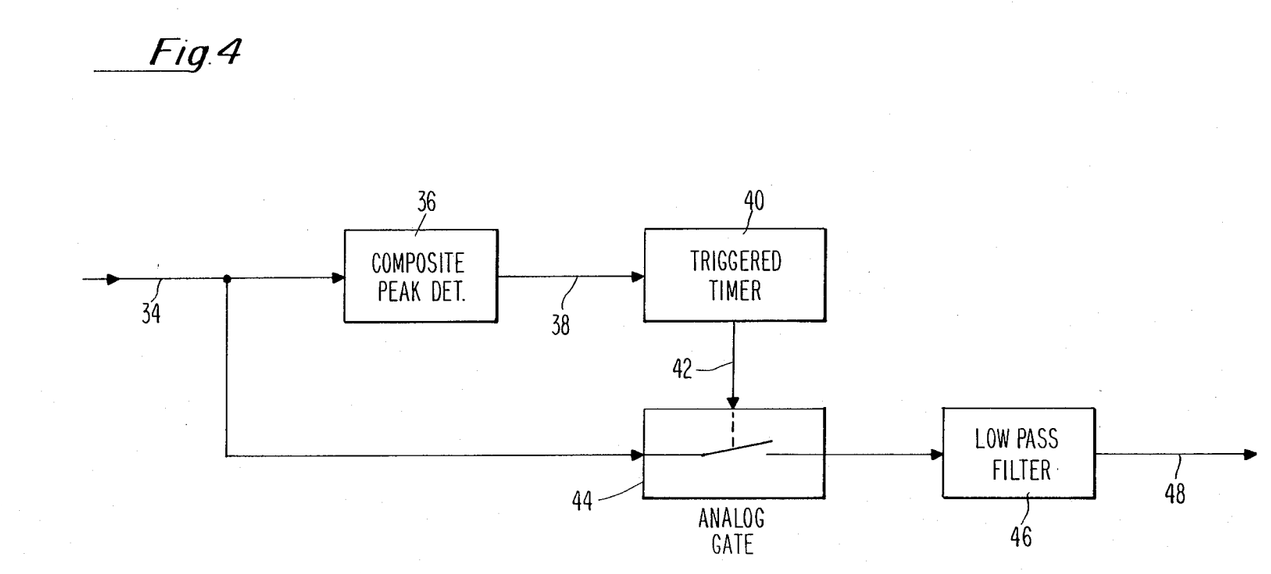
FIG. 4 shows the first preferred embodiment of the decoder.

FIG. 4 shows a first preferred embodiment of the decoder for use with the servo track 10 of FIG. 1.

The signal recovered by the head 26 from the track 10, having been suitably amplified and filtered as is the well known practice with such signals, is supplied via a signal input line 34 as the input to a composite peak detector 36. The composite peak detector 36 responds to the first residual pulse 28 to provide a trigger pulse on a trigger line 38.

The composite peak detector 36 can be of any kind known in the art for detecting such pulses, for example comprising a positive peak detector and a negative peak detector each in receipt of the input line 34 and operable in response to the provision thereon of a positive first residual pulse 28 or a negative first residual pulse 28 respectively to provide a logic output, the logic outputs of the first and second peak detectors being provided as the inputs to an "OR" gate, or being "Wire Or'ed" together to provide logically one output or the other as the signal on the trigger line 38. The positive and negative peak detectors are required to respond to pulses of very small amplitude such as are encountered when the head 26 is close to central disposition over the servo track 10. The point at which pulses 28 cease to be detected by the detector 36 can be chosen by appropriate selection of the type of peak detectors employed and by manipulation of their parameters to lie as close to central disposition of the head 26 over the track 10 as is desired.

The signal on the trigger line 38 is used as the triggering input for a timer 40. On receipt of the triggering pulse from the detector 36, the timer starts an operation which consists in waiting for a first predetermined time until just before the arrival of the second residual pulse 30, then supplying a window signal on a window line 42 until a little after the arrival of the second residual pulse 30. The timing may variously be performed with counters, monostable timers and the like and it will be readily apparent to those skilled in the art how such a timer can be constructed. The timer 40, once started, is not retriggerable by subsequent pulses on the trigger line 38. Thus, should the detector 36 provide an output in response to the second residual pulse 30 the additional response of the detector 36 does not affect the operation of the timer. Those skilled in the art will be able to imagine schemes whereby feed-back can be provided from the timer 40 to the detector 36 to inhibit its operation during the operation of the timer.

The duration of the operation of the timer 40 is such that it is completed before the arrival of any subsequent first residual pulse 28 subsequently to having been triggered (erroneously) by a second residual pulse 30. In this way it is impossible for the timer 40 to become locked onto the wrong residual pulse 30 stream. At very worst the timer will mis-operate for only one pattern 16. It will be apparent how the spacing between the first and second residual pulses 28, 30 and between the second and first residual pulses 30, 28 should be arranged to accomplish this end.

The window signal on the window line 42 is provided as the controlling input to an analog gate 44. The signal from the servo track 10 picked up by the head 26 is supplied via the input line 34 as the analog input to the gate 44. Whenever the window signal is provided on the window line 42 the gate 44 opens to provide as output the analog signal provided on its analog input. Since the window signal is provided by the timer 40 only when the second residual pulse 30 arrives, the output of the gate 44 consists entirely in a serial stream of successive second residual pulses 30. The mean level of the second residual pulses 30 is indicative by magnitude of the size of the displacement of the head 26 from central disposition over the track 10 and indicative by polarity of the direction of that displacement.

The output of the analog gate 44 is provided as the input to a low pass filter 46 whose output, provided on the decoder output line 48, is the mean of its input.

Those skilled in the art will be aware of other methods of dealing with the output of the gate 44, and will be aware of many methods of using the signal provided on the output line 48.

The decoder as described thus has only one pulse height measuring channel with very few components so avoiding the errors induced by component tolerances in those decoders where first and second measuring channels measure pulse height and provide representative signals to a comparator. In effect, in the present system, the comparison of pulse heights occurs by flux summing in the head 26.

Figure 5:
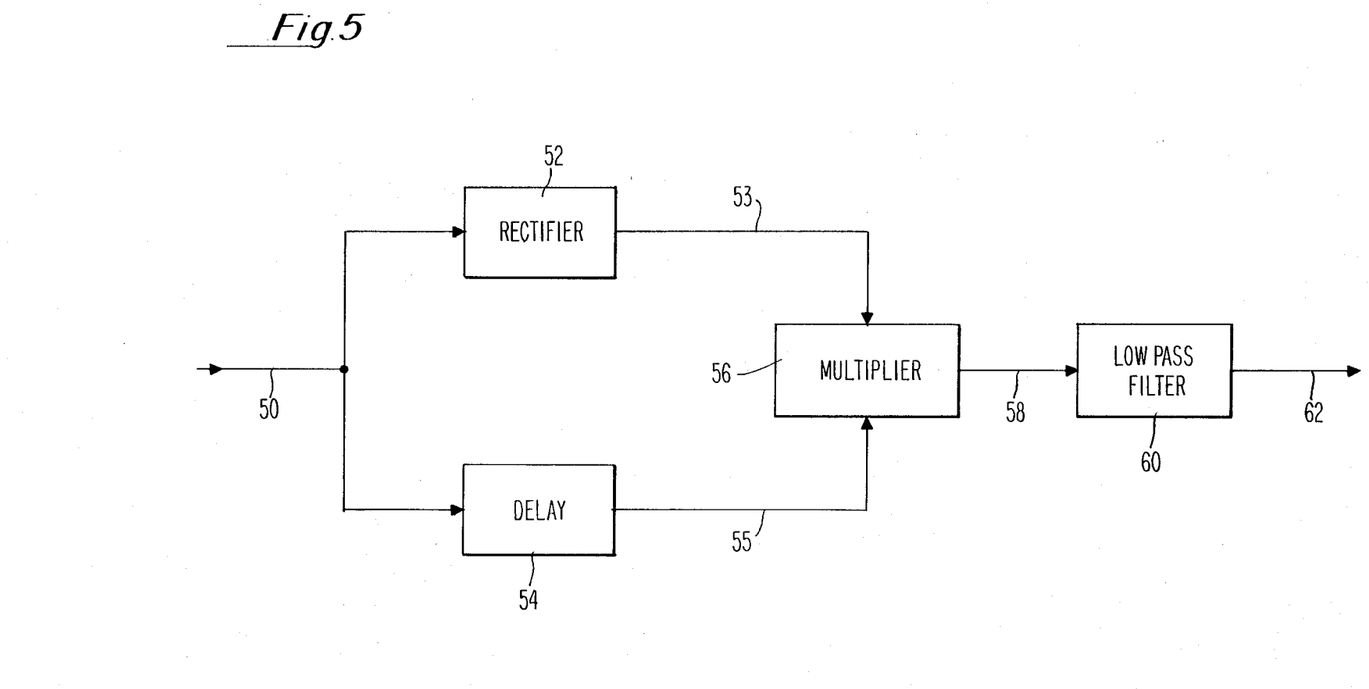
FIG. 5 shows the second preferred embodiment of the decoder.

FIG. 5 shows a second preferred embodiment of the decoder for use with the servo track 10 of FIG. 1.

The amplified and filtered signal recovered by the head 26 from the track 10 is supplied via a signal line 50 as the input to a rectifier 52. The rectifier 52 always provides a positive representation of its input signal regardlessly of its actual input signal polarity. The rectifier 52 can be any one of a number of circuits and those skilled in the art will be aware of methods for the implementation thereof using transistor circuits, bridge rectifiers, amplifier feedback circuits and the like. The output of the rectifier 52 is provided on a rectifier output line 53 as the first input to an analog multiplier 56.

The signal input line 50 also provides the input to a delay 54 whose output is a delayed representation of input having the same polarity at its input and retarded by an amount of time equal to the period between the first residual pulse 28 and the second residual pulse 30. The delay 54 is any type of analog delay ranging from a conventional inductor-capacitor delay line to a charge coupled bucket brigade device, dependently upon the speed required. The output of the delay 54 is coupled via a delay output line 55 as the second input to the analog multiplier 56.

The multiplier 56 responds to its first and second inputs to provide an output signal which is representative of the product of the instantaneous value of the signal on the rectifier output line 53 and of the instantaneous value of the signal on the delay output line 55.

It is arranged that the period between the first residual pulse 28 and the second residual pulse 30 is less than the period between the second residual pulse 30 and the subsequent first residual pulse 28. In this way, when the rectified second residual pulse 30 is arriving as the first input to the multiplier 56 the delayed first residual pulse 28 is arriving on the second input to the multiplier 56 and the multiplier 56 provides an output representative of the product therebetween. However, when the second residual pulse 30 is arriving via the delay 54 as the second input to the multiplier 56 the first input to the multiplier 56 via the rectifier 52 is providing no signal and the output of the multiplier 56 is accordingly zero. The multiplier 56 therefore provides a succession of output pulses on a multiplier output line 58 being the first residual pulse 28 multiplied by the sampling function of the rectified second residual pulse 30. The output pulses of the multiplier are therefore representative of the sense of the first residual pulse 28 and of the magnitude of the product of the magnitudes of the first and second residual pulses 28, 30. The output pulses from the multiplier 56 are smoothed and averaged by a low-pass filter 60 as before.

Figure 6:
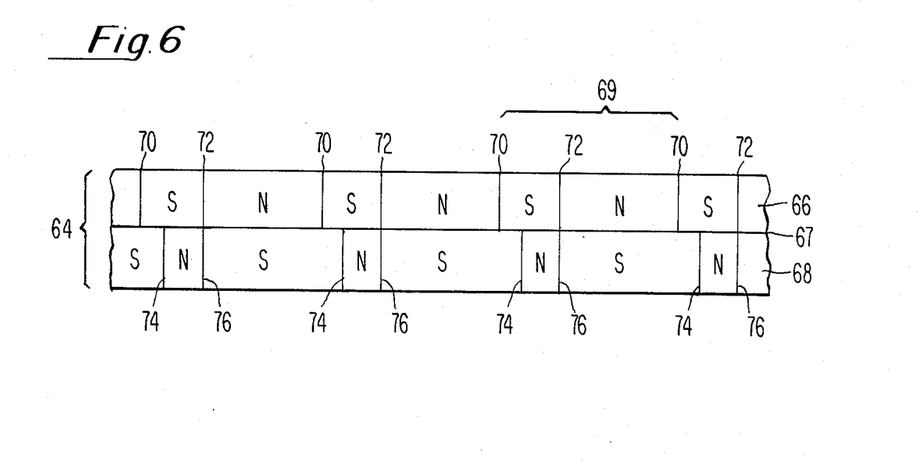
FIG. 6 shows the second preferred embodiment of the servo track.

FIG. 6 shows a second preferred embodiment of the servo track.

In the second preferred embodiment of the servo track 64 everything is as in the first preferred embodiment 10 of the servo track. The second preferred track 64 comprises first and second sub-tracks 66, 68 contiguous along a median line 67 and corresponding to the first and second sub-tracks 12, 14 and median line 15 of FIG. 1. A servo pattern 69 is optionally repeated along the length of the track 64 just as the pattern 16 in the first preferred track 10 is optionally repeated. First, second third and fourth boundaries 70, 72, 74, 76 correspond to the first second third and fourth boundaries 18, 20, 22, 24 of the first preferred embodiment of the track 10. The only difference between the second preferred track 64 and the first preferred track is that in the second preferred track 64 the first boundary 70 is not aligned with the third boundary 74 so that the pulse responses they induce in the head 26 are no longer co-incident in and do not cancel.

Figure 7:
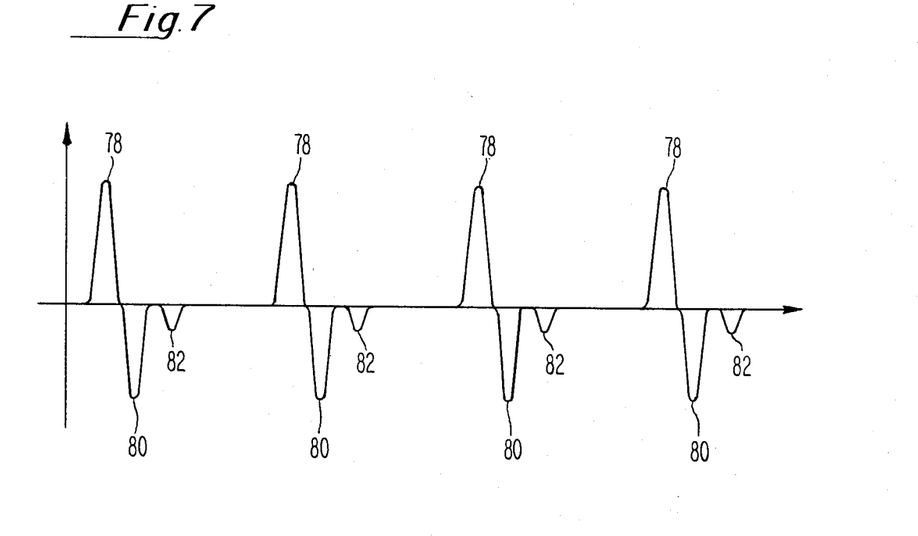
FIG. 7 shows a signal recovered from the servo track of FIG. 6 by the transducer.

FIG. 7 shows the signal recovered by the head 26 from the second preferred track 64.

The first boundary 70 induces a first, positive timing pulse 78 in the head 26. The third boundary 74 induces a second, negative timing pulse 80 in the head 26. The opposition of the second boundary 72 and the fourth boundary 76 as they pass beneath the head 26 cause a position indicating residual pulse 80 whose sense is indicative of the direction of the displacement of the head 26 from central disposition over the track 64 and whose amplitude is indicative of the size of that displacement. The signal is here shown as if the head 26 is disposed more over the first sub-track 66 than over the second sub-track 68.

The first timing pulse 78 is always positive and the second timing pulse 80 is always negative. When the head 26 is entirely over the first sub-track 66 the first timing pulse 78 is at a maximum value and the second timing pulse 80 is at zero value. When the head 26 is entirely over the second sub-track 68 the first timing pulse 78 has zero amplitude and the second timing pulse 80 has maximum amplitude. At intermediate points the first and second timing pulses 78, 80 have intermediate values and their amplitudes always add up to the maximum value, their particular values being determined by the proportional part of the width of the head 26 over each sub-track 66, 68.

Figure 8:
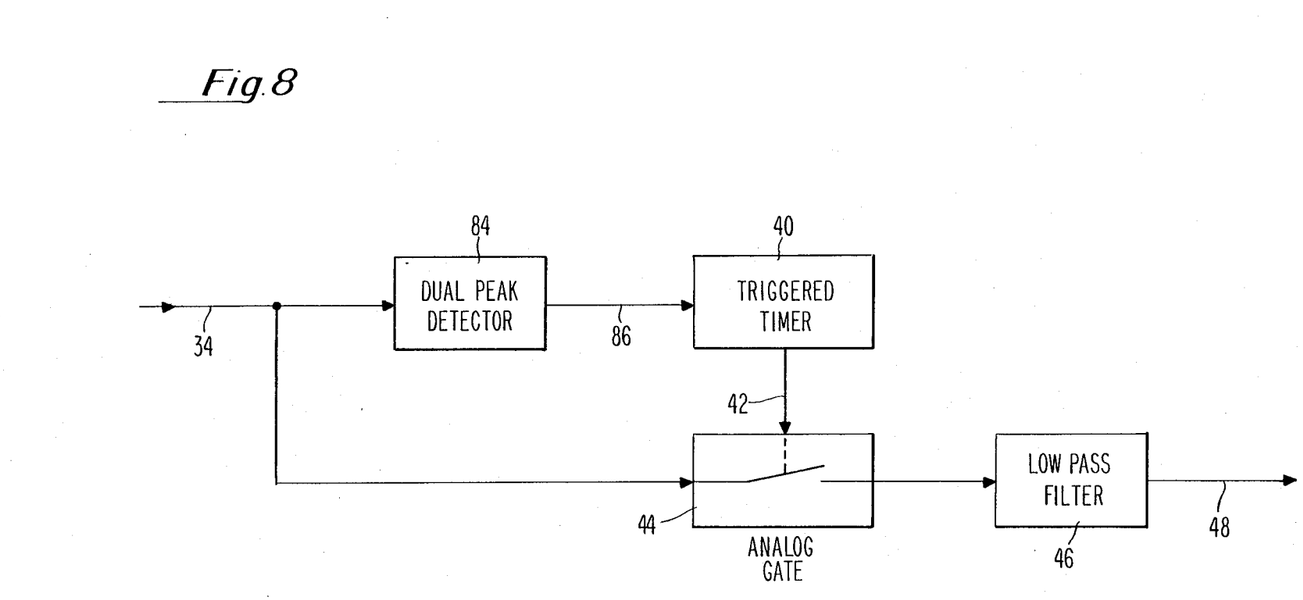
FIG. 8 shows the third preferred embodiment of the decoder.

FIG. 8 shows a decoder suitable for use with second preferred embodiment of the servo track 64.

All things are as in the first preferred decoder as illustrated in FIG. 4, save that the composite peak detector 36 is replaced by a dual peak detector 84 providing an output on a dual peak detector line 86 to the triggered timer 40.

The dual peak detector detects the passage of the first and second timing pulses 78, 80. In its simplest form it can consist of two peak detectors and an "OR" gate just like the composite peak detector 36, with the difference that in the dual peak detector 84 there is no need to detect small amplitude pulses since one or other of the first and second timing pulses 78, 80 will always be of large amplitude. The first predetermined period of the timer 40 should then be chosen such that it is immaterial to the operation of the window whether the first or second timing pulses 78, 80 triggers the timer 40. In a more complicated form the dual peak detector 84 can consist in a zero crossing detector which provides an output pulse if and only if its input voltage passes from positive to negative with more than a predetermined negative slope thereon.

Those skilled in the art will be aware of different methods of implementing the dual peak detector.

In the decoder shown in FIG. 8 the sum of the amplitudes of the first and second timing pulses 78, 80 can be exploited as a method for controlling the scaling factor of the amplitude of the residual pulse 82 by detecting and adding the sums of their 78, 80 amplitudes and subtracting that sum from a predetermined level for use as the gain controlling signal in a gain controlled amplifier.

What I claim is:

1. A system for indicating the position of a transducer relative to a servo track on a moving medium by measurement of the difference between first and second signal components recovered respectively from first and second sub-tracks of said servo track simultaneously accessed by said transducer with respective amplitudes proportional to the respective extents of interaction of said transducer with said first and second sub-tracks, said system being characterized by:
    said first sub-track comprising a first component for inducing a first response of a first polarity in said transducer and a second component for inducing a second response of a second polarity in said transducer,
    said second sub-track comprising a third component for inducing a third response of said second polarity in said transducer and a fourth component for inducing a fourth response of said first polarity in said transducer,
    said first and third responses being simultaneously induced in said transducer,
    said second and fourth responses being simultaneously induced in said transducer to provide a residual response resulting from the cancellation in whole or in part of said second and fourth responses, and
    said system comprising a decoder coupled to receive the output of said transducer and operable to respond to the receipt of said first and/or said third responses to sample said residual response, said residual response being indicative by polarity and magnitude of the direction and distance of displacement of said transducer from equal interaction with each of said sub-tracks.

2. A system according to claim 1 wherein;
said residual response occurs at a first predetermined elapsed period of time after the induction of said first response and of said third response, wherein
no other response is induced in said transducer during a second, predetermined, elapsed period of time after the induction of said residual response, and wherein,
said second predetermined period of time is longer than said first predetermined period of time.

3. A system according to claim 2 wherein;
the induction of said first response is separated by a third predetermined period of time from the induction of said third response to avoid the mutual cancellation thereof, wherein
said decoder comprises a detector coupled to receive said output of said transducer and operable to respond thereto to provide an output indication of the receipt of one, the other or both of said first and third responses, wherein
said decoder comprises a timer coupled to receive said output of said detector and operable to respond thereto to wait for a fourth predetermined elapsed period of time after said indication before providing a timing signal commencing before said induction of said residual response and terminating before the elapse of said second predetermined period of time, and wherein
said decoder comprises an analog gate coupled to receive said timing signal from said timer and to receive said output of said transducer and operable in response to the receipt of said timing signal to allow the through-passage of said residual signal as an output signal.

4. A system according to claim 3 wherein said decoder comprises a low-pass filter, coupled to receive said output of said analog gate and operable to respond thereto to provide an output being a smoothed representation of the level of said residual response indicative by sense and magnitude of the direction and distance of displacement of said transducer from being equally interactive with each of said sub-tracks.

5. A system according to claim 2 wherein;
said first response and said third response are simultaneously induced in said transducer for mutual cancellation in whole or in part to provide a residual timing response, wherein
said decoder comprises a detector coupled to receive said output of said transducer operable in response thereto to provide an output indicative of the reception of said residual timing response, wherein
said decoder comprises a timer, coupled to receive said output of said detector and operable to respond thereto to wait a third predetermined elapsed period of time before providing a timing signal commencing before the induction of said residual response and terminating before the elapse of said second predetermined period of time, and wherein
said decoder comprises an analog gate coupled to receive said timing signal from said timer and to receive said output from said transducer and operable in response to the receipt of said timing signal to allow the through-passage of said residual response as an output signal.

6. A system according to claim 5 wherein said decoder comprises a low-pass filter, coupled to receive said output of said analog gate and operable to respond thereto to provide an output being a smooth representation of the level of said residual response, indicative by sense and magnitude of the direction and distance of the displacement of said transducer from being equally interactive with said first and second sub-tracks.

7. A system according to claim 2 wherein;
said first response and said third response are simultaneously induced in said transducer to mutually cancel, in whole or in part, to provide a residual timing response, wherein
said decoder comprises a rectifier, coupled to receive the output of said transducer and operable to respond thereto to provide output wherein the polarity of said residual timing response and of said residual response are the same, wherein
said decoder comprises a delay circuit coupled to receive said output of said transducer and operable to provide an output representative of said output of said transducer delayed by a period equal to the time between said residual timing response and said residual response, and wherein
said decoder comprises a multiplier, coupled to receive said output of said rectifier and to receive said output of said delay circuit and operable to provide output representative of the product of the instantaneous values thereof.

8. A system according to claim 7 wherein said decoder comprises a low-pass filter, coupled to receive said output of said multiplier and operable to respond thereto to provide an output being a smoothed representation thereof, indicative by sense and magnitude of the direction and distance of displacement of said transducer from being equally interactive with said first and second sub-tracks.

9. A system according to claims 1 or 2 wherein;
said moving medium is a rotary disc for the storage of informational signals, and wherein
said transducer is a head for the recovery of said informational signals therefrom.

10. A system according to claim 9 wherein;
said disc is a magnetic disc, wherein,
said first, second, third and fourth components are magnetic transitions aligned radially on said disc, and wherein
said first, second, third and fourth responses are short-period pulses induced in said head.

11. A system for indicating the position of a transducer relative to a servo track on a moving medium by measurement of the difference between first and second signal components recovered respectively from first and second sub-tracks of said servo track simultaneously accessed by said transducer with respective amplitudes proportional to the respective extents of interaction of said transducer with said first and second sub-tracks, said system being characterized by:
said first sub-track comprising a first component for inducing a first response of a first polarity in said transducer and a second component for inducing a second response of a second polarity in said transducer,
said second sub-track comprising a third component for inducing a third response of said second polarity in said transducer and a fourth component for inducing a fourth response of said first polarity in said transducer, said second and fourth responses being simultaneously induced in said transducer to provide a residual response resulting from the cancellation in whole or in part of said second and fourth responses, and said system comprising a decoder coupled to receive the output of said transducer and operable to respond to the receipt of said first response to sample said residual response, said residual response being indicative by polarity and magnitude of the direction and distance of displacement of said transducer from equal interaction with each of said sub-tracks.

12. A system according to claim 11 wherein:

said residual response occurs at a first predetermined elapsed period of time after the induction of said first response and of said third response, wherein no other response is induced in said transducer during a second, predetermined, elapsed period of time after the induction of said residual response, and wherein, said second predetermined period of time is longer than said first predetermined period of time.

13. A system for indicating the position of a transducer relative to a servo track on a moving medium by measurement of the difference between first and second signal components recovered respectively from first and second sub-tracks of said servo track simultaneously accessed by said transducer with respective amplitudes proportional to the respective extents of interaction of said transducer with said first and second sub-tracks, said system being characterized by:

said first sub-track comprising a first component for inducing a first response of a first polarity in said transducer and a second component for inducing a second response of a second polarity in said transducer, said second sub-track comprising a third component for inducing a third response of said second polarity in said transducer and a fourth component for inducing a fourth response of said first polarity in said transducer, said second and fourth responses being simultaneously induced in said transducer to provide a residual response resulting from the cancellation in whole or in part of said second and fourth responses, said residual response occurring at a first predetermined elapsed period of time after the inducation of said first response and of said third response, no other response being induced in said transducer during a second, predetermined, elapsed period of time after the induction of said residual response, said second predetermined period of time being longer than said first predetermined period of time, and said system comprising a decoder coupled to receive the output of said transducer and operable to respond to the receipt of said first and/or said third responses to sample said residual response, said residual response being indicative by polarity and magnitude of the direction and distance of displacement of said transducer from equal interaction with each of said sub-tracks.

14. A system for providing an output signal indicative of the position of a transducer relative to a servo track on a moving medium, wherein said servo track includes a first sub-track including first and second recorded components for inducing respectively first and second pulses of respectively first and second polarities in said transducer and a second sub-track including third and fourth recorded components for inducing respectively third and fourth pulses having respectively said second and first polarities in said transducer, said first and third and said second and fourth pulses being simultaneously induced and summed in said transducer to provide respectively first and second residual pulses, each of said first and second residual pulses indicative by sense and magnitude of the direction and distance of the displacement of said transducer from central disposition over said servo track, said system comprising a decoder, coupled to receive said residual pulses from said transducer and operable exclusively in response thereto to perform a timing operation to control and perform the measurement of the polarity and magnitude of one, the other or both of said residual pulses and to provide an output indicative thereof.

15. The system according to claim 14, wherein said decoder comprises: a rectifier, coupled to receive said first and second residual pulses from said transducer and operable, to provide as an output, a unipolar representation thereof regardless of their actual polarity, a delay circuit, coupled to receive said residual pulses from said transducer and operable to provide, as an output, a representation thereof delayed by a first predetermined period, and a multiplier, coupled to receive said output of said rectifier and said output of said delay circuit and operable to provide an output representative of the instant product thereof, one of said residual pulses being in advance of the other of said residual pulses by said first predetermined period for said delay circuit to cause co-incident presentation of output from said rectifier and said delay circuit to said multiplier, but the other of said residual pulses not being followed by any other pulse for a second predetermined period which is longer than said first predetermined period.

16. The system according to claim 14, wherein said decoder comprises a composite peak detector, coupled to receive said residual pulses from said transducer and operable in response to the receipt of one of said residual pulses above a predetermined amplitude, to provide an output signal indicative of the receipt thereof, a timer, coupled to receive said output from said composite peak detector and operable to be triggered thereby, to start a timing operation consisting in waiting for a first predetermined period and immediately thereafter providing a window signal for a second predetermined period, and an analog gate, coupled to receive said residual pulses from said transducer as input and to receive said window signal, said analog gate being operable in response to the receipt of said window signal to provide as its output a representation of its input, said second residual pulse following said first residual pulse such that, if said first residual pulse triggers said timer said second residual pulse is presented as input to said analog gate during the presentation of said window signal, said first residual pulse following said second residual pulse by a period greater than the sum of said first and second predetermined periods, said timer not being retriggerable during said first and second predetermined periods whereby, if said first residual pulse triggers said timer said analog gate samples said second residual pulse, but if said second residual pulse triggers said timer said first residual pulse is not sampled and said timer is triggered only by each successive instance of said first residual pulse.

17. The system according to claim 14 or 15 or 16 wherein said moving medium comprises a rotary magnetic disc and said transducer comprises a magnetic read/write head.

18. A system for indicating the position of a transducer relative to a servo track on a moving medium, wherein said servo track includes a first sub-track including first and second recorded components for inducing respectively first and second pulses of respectively first and second polarities in said transducer and a second sub-track including third and fourth recorded components for inducing respectively third and fourth pulses having respectively said second and first polarities in said transducer, said second and fourth pulses being simultaneously induced and summed in said transducer to provide a residual pulse indicative by sense and magnitude of the direction and distance of the displacement of said transducer from central disposition over said servo track, said system being characterized by said first and third pulses being separated by a first predetermined period sufficient to prevent the mutual cancellation in whole or in part thereof, said system comprising a decoder, coupled to receive said pulses from said transducer and operable exclusively in response thereto to perform a timing operation to control and perform the measurement of the polarity and magnitude of said residual pulse and to provide an output indicative thereof.

19. The system according to claim 18 wherein said decoder comprises: a composite peak detector, coupled to receive said pulses from said transducer, operable to detect the one, the other or both of said first and third pulses and operable to provide an output indicative thereof, a timer coupled to receive said output from said composite peak detector and operable in response thereto to wait for a delay period and then provide a gate signal for a second predetermined period, and an analog gate, coupled to receive said pulses from said transducer and said gate signal from said timer, and operable in response thereto to allow the through passage of said residual pulse to an output, said delay period and said second predetermined period being such that said residual pulse and none other is allowed passage through said gate regardless of whether said composite peak detector detects said first pulse, said third pulse or both.

20. The system according to claim 17 or 18 or 19 wherein said moving medium is a rotary magnetic data storage disc, and wherein said transducer is a read/write head.

* * * * *

UNITED STATES PATENT AND TRADEMARK OFFICE
CERTIFICATE OF CORRECTION

PATENT NO. : 4,519,007
DATED : May 21, 1985
INVENTOR(S) : Graham Paul Sellars

It is certified that error appears in the above-identified patent and that said Letters Patent is hereby corrected as shown below:

Column 7, line 12, change "valve" to --value--.

Signed and Sealed this

Twenty-fifth Day of February 1986

[SEAL]

Attest:

DONALD J. QUIGG

Attesting Officer  Commissioner of Patents and Trademarks